Dec. 29, 1970  D. ERICKSSON  3,550,192
DEVICE FOR THE ORIENTATION OF FISHES
Filed Nov. 13, 1967  7 Sheets-Sheet 4

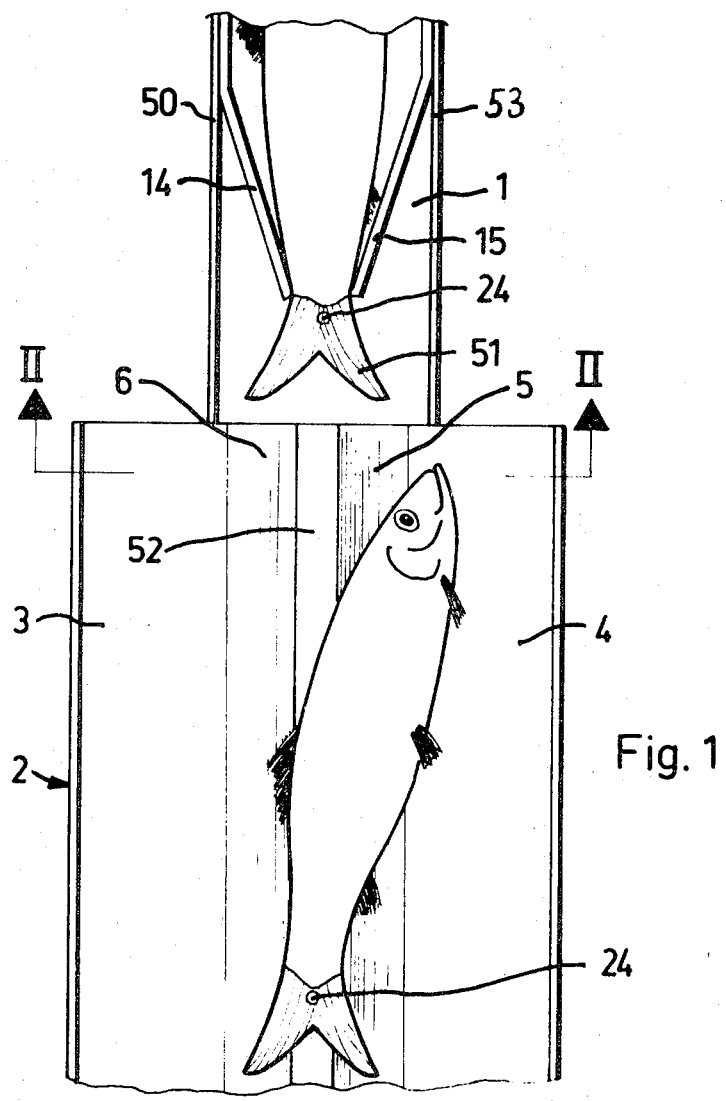
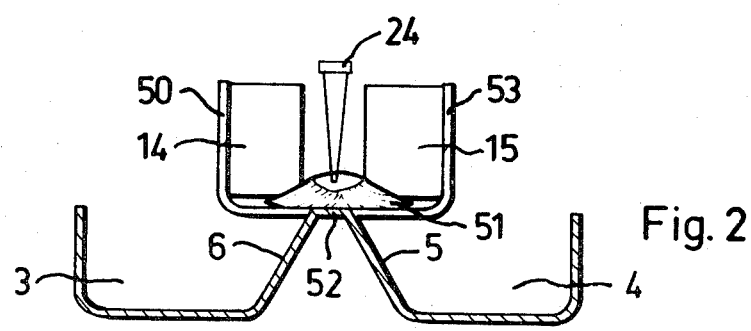

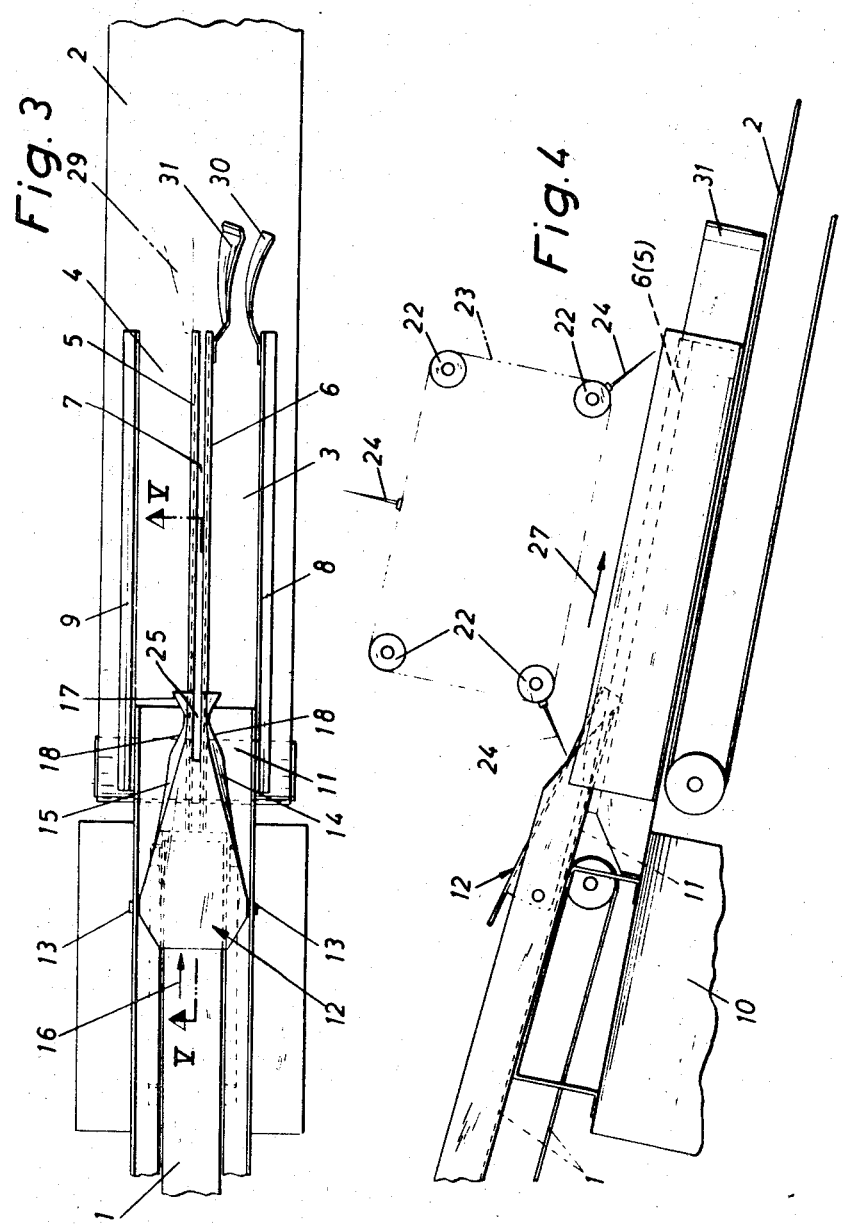

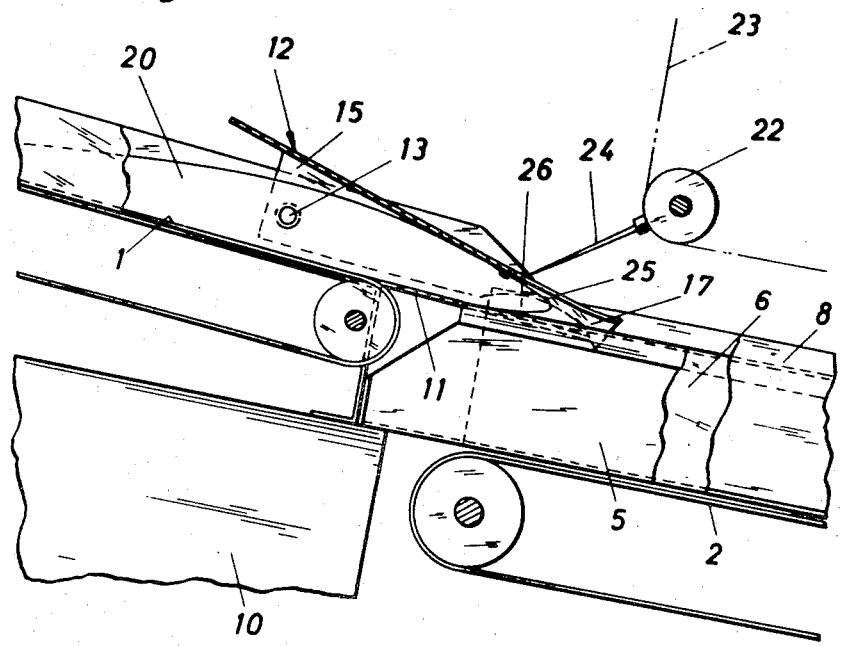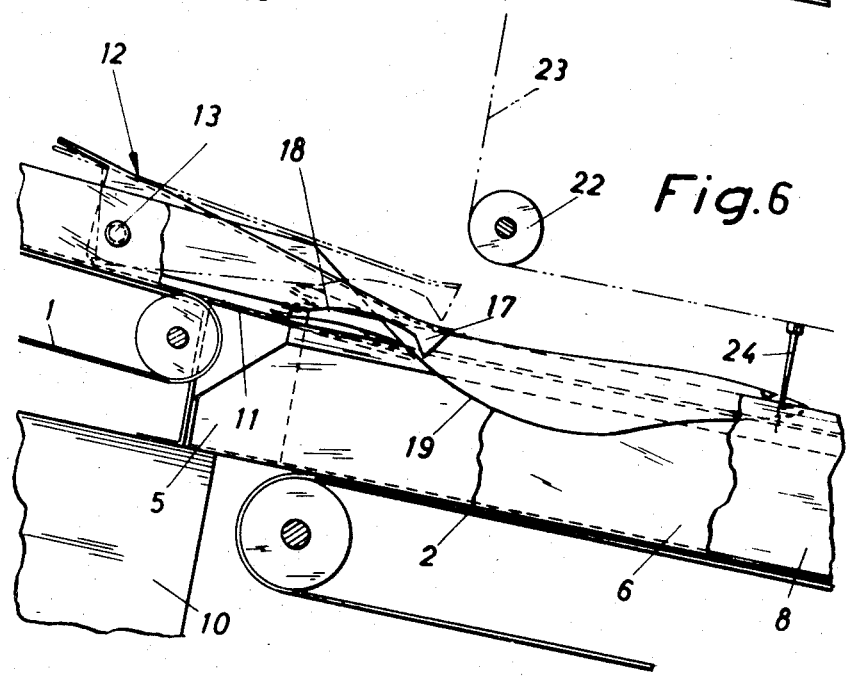

Dec. 29, 1970    D. ERICKSSON    3,550,192
DEVICE FOR THE ORIENTATION OF FISHES
Filed Nov. 13, 1967    7 Sheets-Sheet 5

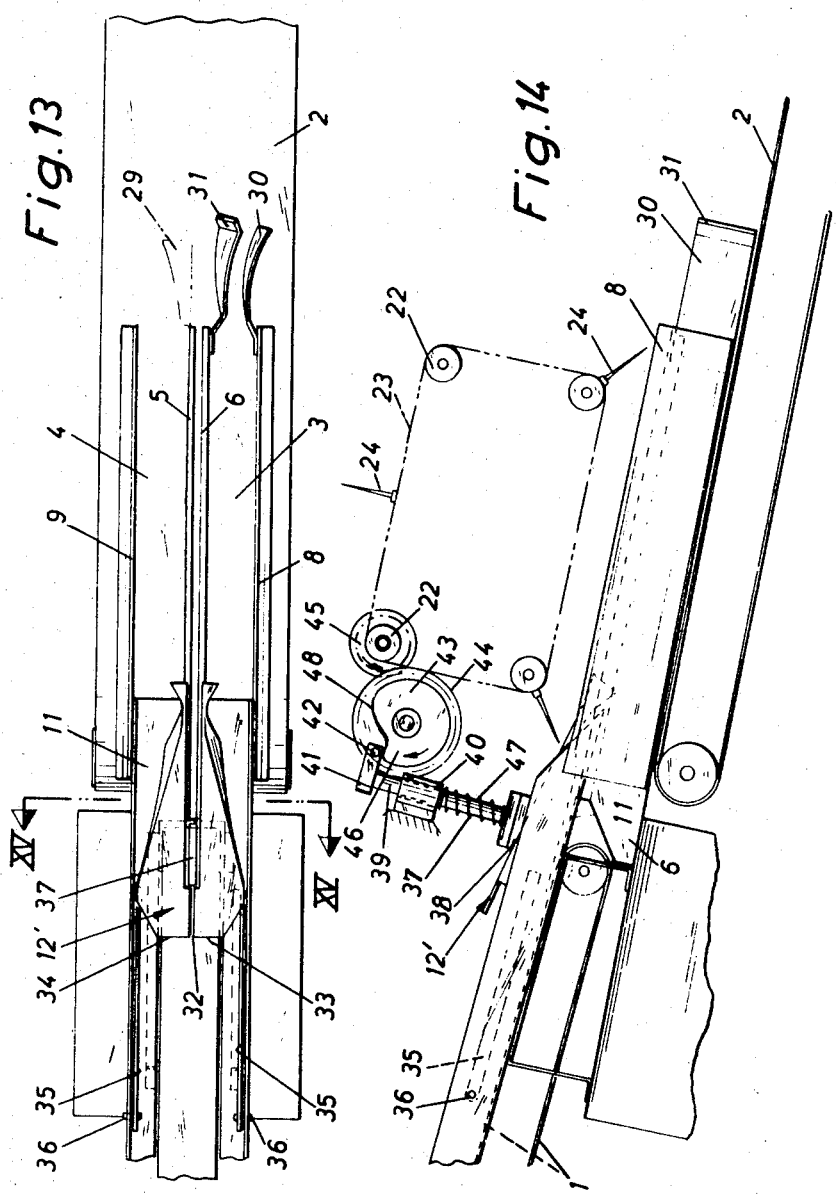

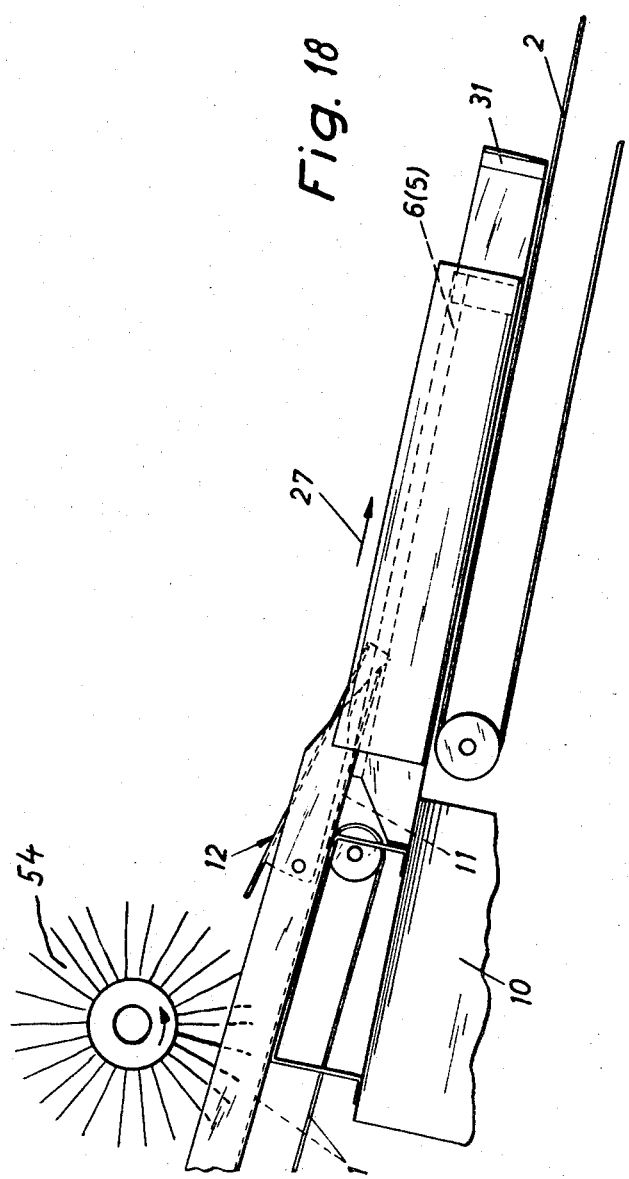

United States Patent Office 3,550,192
Patented Dec. 29, 1970

3,550,192
DEVICE FOR THE ORIENTATION OF FISHES
Dan Ericksson, Hisingsbacka, Sweden, assignor to Arenco Aktiebolag, Stockholm-Vallingby, Sweden
Filed Nov. 13, 1967, Ser. No. 681,977
Claims priority, application Sweden, Nov. 17, 1966, 15,783/66
Int. Cl. A22c 25/08
U.S. Cl. 17—55                                    9 Claims

ABSTRACT OF THE DISCLOSURE

A device for turning fishes so that their bellies point in a determined direction, comprising a support surface, on which the fish is conveyed in its longitudinal direction, a conveying surface including a ridge having a narrow top surface and extending in the advancing direction of the fish, guiding means to guide the fish from the support surface to said top surface of said ridge and a movable gripping means adapted to impart to the fish a movement through the guide means and along said top surface of said ridge.

---

The present invention relates to a device for the orientation of fishes, for instance herring, so that their bellies are turned to point in a determined direction, the fishes being lying on a conveyor or in a conveying chute by means of which the fishes are conveyed, either head or tail first, to various treating stations or apparatuses.

Prior art arrangements designed to position and turn the fish in this manner employ the use of guide plates to obtain the intended effect; the fish being passed between the guide plates and turned by the same. However, such arrangements have been found less reliable than can be desired, since the number of wrongly turned fish exceeds the proportion accounted acceptable.

The object of the present invention is to provide an arrangement in which the use of guide plates acting upon the body of the fish to obtain the desired position of the fish is relied upon to a much lesser extent than in known apparatus, and which instead is based on the location of the centre of gravity of the fish.

The arrangement according to the invention is mainly characterized by a ridge extending in the advancing direction of the fish on the conveying surface and presenting a narrow top surface relative to the width of the fish, a support surface on which the fish are advanced towards said ridge guided by guide means comprising walls which converge towards the beginning end of the ridge and a gripping means adapted to impart to the fish a movement through the guide means and along the top surface of the ridge, said guide means being arranged to position the fish in lateral direction in relation to the ridge so that the centre of gravity of the fish during the movement of the same along the top surface of the ridge lies beyond the one edge of said top surface.

In that the centre of gravity of the fish lies beyond the narrow upper surface of the ridge the fish will always slide down the side surfaces of the ridge, with their bellies pointing in the same direction.

To control the lateral alignment of the fish relative to the ridge at the moment when the fish is gripped by the gripping means and pushed or pulled away on to the ridge, the mechanical guide means positions the centre of the leading end of the fish mainly in line with the centre line of the ridge after which the rest of the fish, guided by the yielding walls of the guide means, is passed on to the narrow upper surface of the ridge. Although it is difficult to determine the exact position of the centre of gravity of the fish the results of experiments made clearly show that said centre lies sufficiently beyond the narrow upper surface of the ridge to essentially reduce the number of wrongly turned fishes relative to hitherto known devices.

Figure 7:
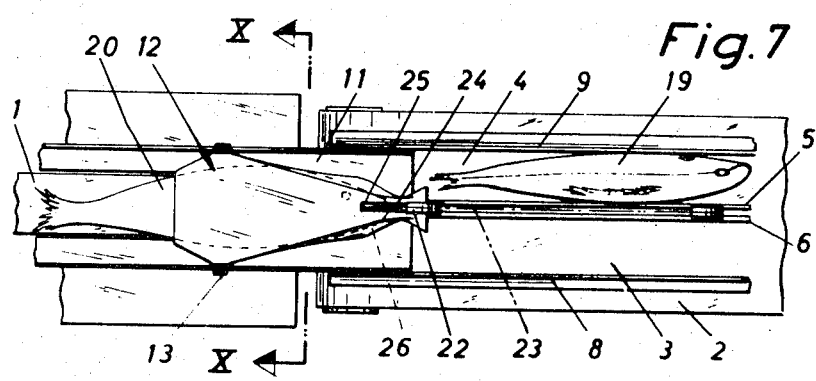
Figure 8:
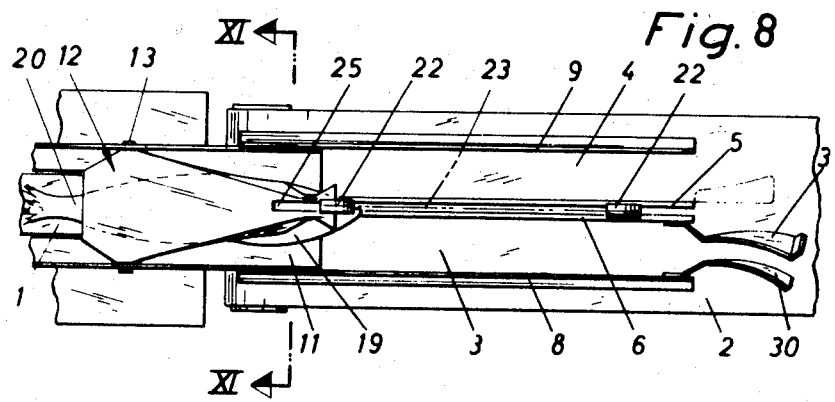
Figure 9:
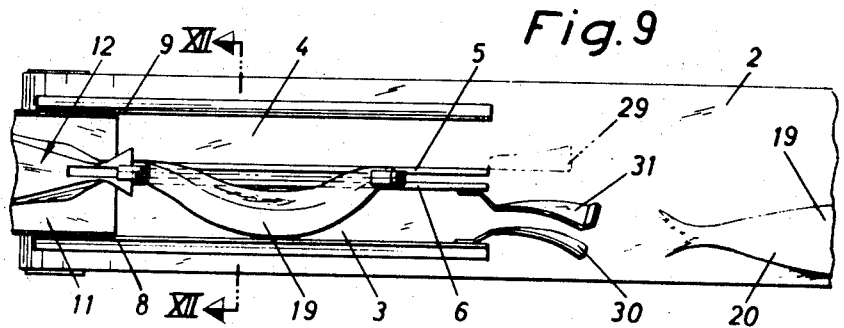
Figure 10:
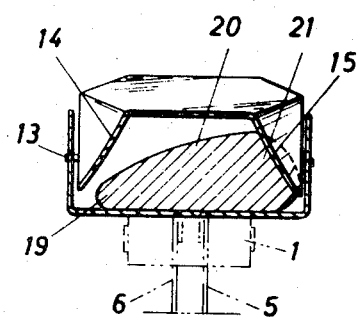
Figure 15:
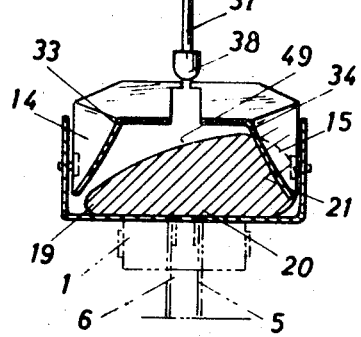
Figure 11:
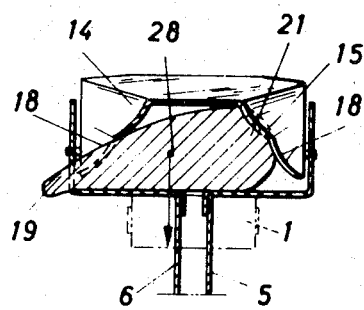
Figure 16:
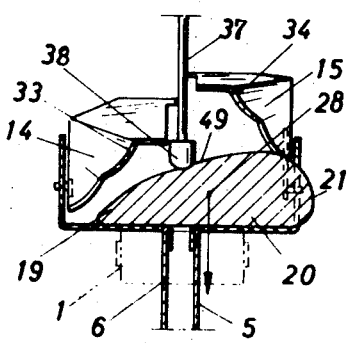
Figure 12:
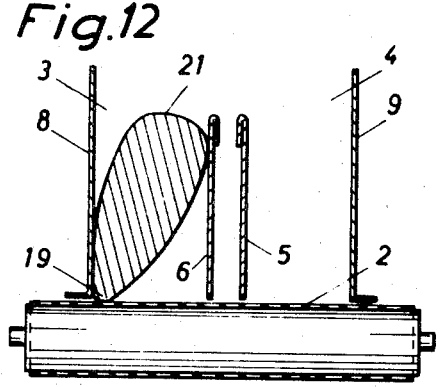
Figure 17:
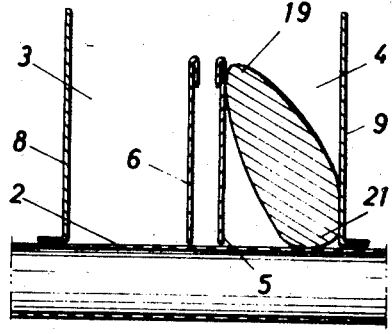

Various embodiments of the invention will now be described with reference to accompanying drawings, in which:

FIG. 1 shows an embodiment, in which the fish is conveyed tail first in the conveying direction, FIG. 2 is a section taken through the line II—II in FIG. 1, FIG. 3 is a plan view of a turning apparatus according to another embodiment, FIG. 4 shows the apparatus according to FIG. 3 seen from the side, FIG. 5 is an enlarged section taken through the line V—V in FIG. 3, showing a fish in the guide means of the apparatus, FIG. 6 is a similar section, which shows the fish as it is being drawn along the ridge of the apparatus, FIG. 7 is a plan view of the apparatus according to FIG. 5, FIG. 8 is a similar plan view with the fish partly drawn from the guide means, FIG. 9 is a similar plan view with the fish shown positioned in one feeding chute and situated with the belly facing downwards, FIG. 10 is a section taken through the line X—X in FIG. 7, FIG. 11 shows a section taken through the line XI—XI in FIG. 8, FIG. 12 shows a cross section taken through the line XII—XII in FIG. 9, FIG. 13 is a plan view of a third embodiment of the apparatus, FIG. 14 is a side view of the apparatus in FIG. 13, FIG. 15 is a cross section in enlarged scale taken through the line XV—XV in FIG. 13, FIG. 16 is a similar cross section showing the fish being drawn forwards somewhat, FIG. 17 is a further cross section taken through the apparatus, showing the fish positioned in one feed chute, resting on its back, and FIG. 18 is a side view of a modified gripping means.

Included in the embodiment of the turning apparatus shown in FIGS. 1 and 2 are two conveying means 1 and 2. The conveying means 1 which comprises a chute presenting sloping walls 50, 53 is fed manually or by means of an apparatus (not shown) suitable for the purpose, so that the fish slide tail first towards a guide means comprising two springing side walls 14 and 15, which converge towards the conveying means 2. The ends of the side walls 14, 15 facing away from the conveying means 2 are attached to the walls 50, 53 so that a clearance is left between the bottom edges of the side walls 14, 15 and the bottom of the conveying means 1. The distance between the bottom edge of each side wall 14, 15 and the bottom of the conveying means 1 should be sufficient to allow the tail fin 51 of the fish to pass therebetween. The width of the opening between the side walls 14 and 15 (see FIG. 2) in the normal position of the side walls, which is shown in FIGS. 1 and 2, is substantially equal to the width of the fish at the tail fin and the angle between the side walls 14, 15 is selected so that when a fish slides forward in the conveying means 1 towards the guide means comprising the side walls 14 and 15 the tail end of the fish will be aligned at right angles to the conveying direction. When the fish occupies a position shown in FIG. 1 on the conveying means 1 it is engaged by a carrier pin 24. The pin 24 and a pin drive means, chosen by way of example, are shown in more detail in FIG. 4. The pin 24 is moved, in a manner, which will be described later, along the ridge and parallel to the same, carrying with it the fish against the action of the yielding side walls 14 and 15. As soon as the fish has left the guide means and has thus been pulled out onto the top surface of the ridge, which is narrow in relation to the width of the fish, the fish slides down the ridge wall 5 belly first. The head of the fish reaches the bottom 4 of the chute and is dragged along until the pin 24 is withdrawn from the tail end of the fish, whereupon the tail of the fish also comes to rest on the bottom of the chute 4. Since the chute 4, as well as chute 3, is wider than the fish to be treated the fish in this instance lies on its side with the belly facing away from the ridge.

This position is imparted to all fishes, which when they reach the side walls 14, 15 are lying on their sides with their belly turned towards the wall 53. Fish with their belly facing the wall 50 slide down into the chute 3 belly first after being dragged out onto the ridge. The reason why the fish slide down into the chute 3 or 4 belly first is that the fish are so positioned by the side walls 14 and 15 that their centre of gravity lies to the right of a line in FIG. 1 extending through the engagement point of the pin 24 and that point at which the head rests on the top 52 of the ridge before the fish begins to slide down into its chute. It will be understood that the engagement point can also be selected through the medium of the side walls 14, 15 so that the fish always slide into a chute back first. Consequently, two streams of fish are obtained by means of the shown apparatus, namely one from the chute 3 and one from the chute 4; wherein all fish in the two streams occupy the same position of arrangement.

The turning apparatus illustrated in FIGS. 3–17 also presents two conveying means 1 and 2; of which the one is connected to an apparatus (not shown) which ensures that all fish entering the turning apparatus arrive head first. The second conveying means 2 forms the bottom of two parallel chutes 3, 4, which extend in the direction in which the fish are advanced. The inner walls 5, 6 of the chutes 3, 4 are situated some distance apart so that a longitudinal groove 7 is formed. The outer walls 8, 9 of the chutes 3, 4 are suitably adapted for lateral movement so that the width of the chutes can be varied.

Located at the end of the feed-in conveyor 1 is a plate 11 supported by the frame 10 of the apparatus, and arranged above said plate is a guide means, which also serves as stop means for the arriving fish. According to the embodiment shown in FIGS. 3–12 the guide means comprises a flap 12, which is pivotally mounted at its rear end around two coaxial, horizontal studs 13. The flap 12 is provided with downwardly directed side walls 14, 15, which diverge in a downward direction. The side walls 14, 15 also converge forwards in the feeding direction of the conveyor 1, indicated by the arrow 16 in FIG. 3. The walls 14, 15 are provided in proximity of the discharge end 17 of the flap 12 with a recess 18 so that elongated gaps are formed between the bottom edge of the walls 14, 15 and the plate 11 through which the belly 19 (FIG. 8) of a fish 20 can penetrate while the back 21, which is considerably thicker than the belly of the fish, is guided by the opposite wall 15 (according to FIG. 11).

Arranged above the inner walls 5, 6, which together form a ridge extending in the feed direction, is an advancing means for dragging the fish 20 one at a time from under the guide means, the flap 12. According to the embodiment shown in FIG. 4 the dragging means comprises a number of carrier pins projecting from an endless belt 23 or the like driven over four pulley wheels 22. The pins are adapted so that the free ends thereof project through an elongated slot 25 in the upper portion of the flap 12, near the discharge end 17, and engage the head 26 of a fish 20 newly arrived below the flap 12, so as to drag the fish to the right, as seen in the drawings (see the arrow 27 in FIG. 4) sliding on the ridge formed by the upper edges of the walls 5, 6.

When a fish 20 arrives on the conveyor 1 it is advanced whilst lying on its one side or the other with the head in under the flap 12 and is stopped by the side walls 14, 15 when the head 26 has reached the forward end 17 of the flap, visible through the slot 25 at its rear end. The nearest pin 24 extends through the slot 25 and engages the head of the fish and drags the fish onto the walls 5, 6, the free end of the pin 24 engaging in the groove 7 between the walls and is guided by the same. When advancing the fish 20, which in the illustrated instance is conceived to lie on one side with the belly 19 turned to the left according to FIGS. 10 and 11, the fish is guided to the left by abutment of the back portion 21 against the right hand wall 15 so that the belly 19 slides out under the wall 14. Consequently the centre of gravity 28 of the fish (FIG. 11) is located to the left of wall 6. Upon continued advancement of the fish 20 the said fish falls, activated by its own weight, down into the left hand chute 3 with the belly 19 resting on the conveyor 2. Subsequent to the fish being fed from the chute 3 it lays flat on the conveyor 2. As an added measure to ensure that the fish is positioned in the intended manner a guide plate 29 may be mounted at the discharged end of the chute 4 as indicated by the dash-dot lines in the drawing.

It is obvious that if the fish arriving on conveyor 1 is positioned on the opposite side, i.e., with the belly 19 turned to the right in FIGS. 10 and 11, and the fish has been advanced by means of the pin 24, sliding on the ridge between the chutes 3, 4 in the above described method, the fish in this instance will be forced out through the opening 18 of the wall 15 and thus fall into the chute 4, wherein also in this alternative the belly rests on the conveyor 2. The fish is then turned by two turning plates 30, 31 arranged at the discharge end of the chute 3 so that said fish lies on the same side as the fish discharged from the chute 4, i.e., with the belly facing in the same direction as the bellies of these fishes.

In the embodiment shown in FIGS. 13–17 the flap 12' is assumed as being in two halves, presenting a longitudinally extending gap 32 between the two flap halves 33, 34. Each flap half 33, 34 presents a rearwardly extending arm 35, which is pivotally mounted at its rear end about a shaft pin 36.

Arranged above the plate 11 is a vertically displaceable arm 37 or the like, which extends parallel with the plane of the plate 11 and which engages in the gap 32. The top portion of the arm 37 merges into a plate 38 and this in turn into a plunger 39, which is vertically displaceable in a bearing 40 and which presents at its upper end a head 41 provided with a laterally directed pin 42. Cooperating with the pin 42 is a cam disc 43 operated over two gear wheels 44, 45 from the one of the pulley wheels 22 of the chain 23 with the pin 24. The disc 43 is provided with a lifter cam 46. A helical spring 47 is secured between the plate 38 and the bearing 40.

The turning apparatus functions in the following manner. When the disc 43 is rotated to such an extent that a recess 48 in the disc has reached the pin 42 the spring 47 urges the arm 37 against the sloping top surface 49 of the fish 20 (FIG. 16). Because of the laterally directed reaction forces acting on the fish the fish is thus displaced to the right, according to FIG. 16, lifting flap half 34 with the forward end upwards, at the same time as the fish is dragged along the longitudinally extending ridge 5, 6 by means of the pin 24 engaging down in the slot 32. The centre of gravity 28 of the fish is thus moved to the right of the wall 5 and subsequent to the fish being drawn forwards under the flap the said fish falls under its own weight down into the chute 4, resting with its back 21 on the conveyor 2.

As will be understood, if the fish advanced on the conveyor 1 had instead rested on its opposite side, whereby the belly 19 was turned to the right instead of the left in FIGS. 15 and 16, the fish would have fallen back first down into the chute 3. In both instances the fishes are thus advanced on conveyor 2 resting on their backs 21. The fishes are then turned by means of the guide plates 30, 31 in the chute 3 so that the bellies of said fish face in the same direction as those arriving from the chute 4.

Since the fish 20, regardless of whether they are turned in the manner illustrated in FIGS. 10–12 or the manner illustrated in FIGS. 15–17, are always advanced obliquely in respective chutes 3, 4, occupying the same positioning, it is easy to turn the fish by means of turn plates 30, 31 so that the bellies of said fish face in the same direction on the discharge conveyor 2.

The shown and described embodiments are merely to be considered as examples and the various members of the turning apparatus may be changed arbitrarily within the scope of the following claims. The member for dragging the fish forward may be given a completely different construction than that shown in FIG. 14. The pin 24 may be advanced above the ridge in a manner different to that shown. Moreover, the dragging member can be replaced by a gripping means that includes a rotating driving means presenting a cylindrical, resilient friction surface, as shown in FIG. 18, in which a rotating brush 54 is shown adapted to engage the fish arriving to the guide means 14, 15. The member 37 for laterally displacing the fish under the flap 12' may be designed in a manner different to that shown in FIG. 14 and may also be lifted and pressed down against the fish in a manner different to that shown. The flap 12 of the first embodiment can also be divided into two longitudinally extending halves, whereby each half may be lifted individually.

I claim:

1. A device for the orientation of fish, for example, herring, so that their bellies are turned to point in a determined direction, comprising a support surface (11), means to advance the fish in their longitudinal direction lying on their one side on said support surface, a guide means on said support surface, said guide means having walls (14, 15) converging in the advancing direction of the fish and forming an inlet opening and an outlet opening, a ridge (5, 6) located in register with said outlet opening and presenting a narrow top surface aligned with said guide means, gripping means (1, 22, 23, 24, 54) for imparting to the fish a movement through said outlet opening and along said narrow top surface, and feed out chutes situated along opposite sides (5, 6) of said ridge and adapted to receive the fish sliding down from said top surface under the influence of gravity.

2. A device as claimed in claim 1, characterized in that each feeding chute presents a width which is less than the widest cross-dimension of the fish.

3. A device as claimed in claim 1, characterized in that at least one of the feeding chutes (3, 4) presents at the discharge end means for turning the fish so that they are positioned on one side with their bellies (19) turned to face in the same direction.

4. A device as claimed in claim 1, characterized in that the converging walls (14, 15) which form an outlet opening in registration with the ridge (5, 6) together with the support surface (11), form a slot (18) in proximity to the ridge adapted to permit the belly (19) of the fish to slide out laterally during advancement of said fish while the opposite wall forms a guide for the back (21) of said fish.

5. A device as claimed in claim 4, characterized in that the walls (14, 15) form downwardly directed side walls of a flap (12) which is capable of being raised at the end (17) situated nearest the ridge (5, 6).

6. A device as claimed in claim 1, characterized by a conveyor (1) for conveying the fish (20) in between the guide walls (14, 15) to a position in which the fish can be engaged by the gripping means (24, 54).

7. A device as claimed in claim 6, characterized in that the gripping means includes a pin (24) adapted to engage the leading end of the fish (20) and extend in an elongated groove (7) in the ridge (5, 6).

8. A device as claimed in claim 1, characterized in that the gripping means comprises a rotating brush presenting a cylindrical resilient friction surface in engagement with said fish for moving said fish through said guide means.

9. A device as claimed in claim 1, characterized in that said guide means further comprises an arm (37) movable into engagement with the side of said fish along the longitudinal center line of said fish to thereby force said fish to move laterally towards the back portion (21) of said fish when the guide means is urged against the upwardly directed side (49) of said fish.

References Cited

UNITED STATES PATENTS

| | | | |
|---|---|---|---|
| 1,893,903 | 1/1933 | Mullins | 17—2 |
| 3,237,750 | 3/1966 | Eriksen | 17—2X |
| 3,315,299 | 4/1967 | Danielsson | 17—2 |
| 3,348,260 | 10/1967 | Bartels et al. | 17—2 |

FOREIGN PATENTS

| | | | |
|---|---|---|---|
| 38,566 | 12/1923 | Norway | 17—2 |
| 44,951 | 3/1928 | Norway | 17—2 |

LUCIE H. LAUDENSLAGER, Primary Examiner